No. 702,391. Patented June 17, 1902.
W. A. ARNOLD.
DIE FOR CUTTING MOSAIC BLOCKS.
(Application filed Apr. 30, 1901.)
(No Model.)
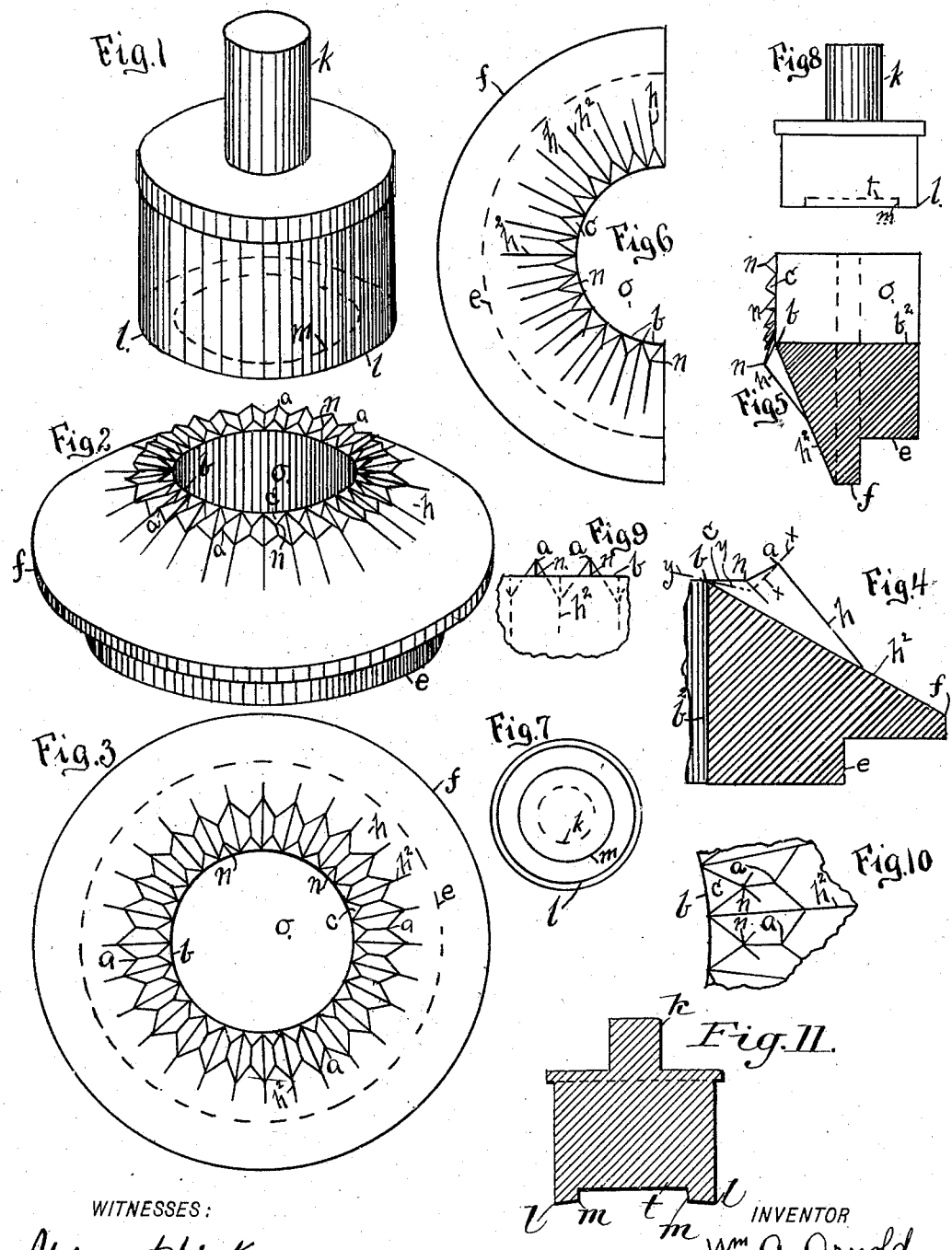
WITNESSES:
John Hickman
Charles H. Skelton.
INVENTOR
Wm. A. Arnold
BY J. Irving Terhune
ATTORNEY

UNITED STATES PATENT OFFICE.

WILLIAM A. ARNOLD, OF PATERSON, NEW JERSEY.

DIE FOR CUTTING MOSAIC BLOCKS.

SPECIFICATION forming part of Letters Patent No. 702,391, dated June 17, 1902.

Application filed April 30, 1901. Serial No. 58,143. (No model.)

*To all whom it may concern:*

Be it known that I, WILLIAM A. ARNOLD, a citizen of the United States, residing at 471 Ellison street, Paterson, county of Passaic, and State of New Jersey, have invented a new and useful Improvement in Punches and Dies for Making Mosaics, of which the following is a specification.

My invention relates to dies for cutting marble, granite, and other stone into shapes such as are used in laying mosaic flooring and the like, and has for its object, first, the cutting of mosaics into any shapes—such as sprays, squares, polygons, circles, or any other shape for the solid block or slab—and the said shapes to have smooth surfaces and their edges perfect; second, to reduce the amount of waste as compared with the methods now in use. I attain these objects by the mechanism illustrated in the accompanying drawings, in which—

Figure 1 represents a perspective view of the punch; Fig. 2, a similar view of the die; Fig. 3, a plan of Fig. 2. Fig. 4 is a vertical section of a segment of the die. Fig. 5 is a vertical section of a segment of the die with the outer row of pyramids or perforating-points left off and the triangles slightly raised above the level of the cutting edge. Fig. 6 is a plan of one half of the die as shown in Fig. 5. Fig. 7 is a view of the bottom of the punch as shown in Fig. 1. Fig. 8 is a side view of the punch. Fig. 9 is a detail of a small portion of the die shown in Fig. 4, illustrating the perforating-points. Fig. 10 is a plan of Fig. 9. Fig. 11 is a vertical section of Fig. 8.

Similar letters refer to similar parts throughout the several views.

Fig. 1 is an ordinary punch, except that the bottom is slightly recessed, showing the cutting edge $l$ and an inner one $m$. The die is made of steel and has a hole $o$ in the center. The part $e$ is turned to the shape shown, so as to hold the die in a bed in a machine for doing the stamping. The punch, as shown in Fig. 1, also has a shank $k$, which is inserted in the machine for operating the same. The cutting or working portion of the female die is constructed as follows: A row of small pyramids are constructed exterior to the cutting portion of the die. The several points of these pyramids are either on a level with the cutting edge $b$ or are slightly higher, depending on the hardness and brittleness of the stones to be cut. The advantage of this raised position of the apex $a$ of the pyramids is to have the several points perforate or prick the marble or other stone, and thus crack or break it from the larger piece before it starts to cut the perfect outline of the mosaic piece. When it is thus cracked, all the die has to do is to crumble or shell off the outside edge contained in the space between the desired true edge $b$ and the apex $a$ of the numerous pyramids. The valleys between the pyramids and running from the cutting edge $b$ are for facilitating the carrying off of the crushed particles and chips, and the exterior slopes $h$ and $h^2$ of the pyramids and die serve to push the larger portion of the slab or pieces, from which the mosaics are cut, away from the piece cut. In some cases for some kinds of work the exterior row of points are left off—*i. e.*, the $a$ points—and the die is then in the style shown in Figs. 5 and 6. The points $n$ are in that case the ones that do the perforating, as explained above, and the stone between the points $n$ and the edge $b$ in this case does the shelling off or crumbling. The points $n$ in this case are the same as they were before the pyramids $d$ were removed and for some work have to be slightly raised to do the perforating, as shown in Figs. 5 and 6.

The punch, as shown in Figs. 1 and 7, is constructed either with a flat surface covering the whole face of the punch or with a portion hollowed out, as shown by the lines $m$ and $l$, depending on the hardness of the stone to be cut. The punch does not need to enter the die when in operation, only necessarily coming to within about an eighth of an inch of the cutting edge. The punch can therefore be larger than the opening in the die, and I so construct it that the size at $m$ is about the same size or a trifle smaller than the size of the opening on the die. This is for the following purpose: When the nature of the stone requires it, the stone in the space between the edges $m$ and $l$ when in contact will crumble or crush, thus assisting the die. The size of the edge $l$ is about the same as the line of the points of the pyramids in the die. The opening $o$ in the die is so constructed that the lower part at $b^2$ is larger than at the cutting edge $b$.

It may be necessary to in some cases depress the triangles $c$ below the level of the cutting edge $b$ slightly to a position shown by the dotted line $y$ in Fig. 4. The line to the apex of the pyramid in this case would be in the position shown by the line $x$ in the same figure. The line from the point of the triangle $c$ to the apex $a$ is a cutting or severing edge also.

Looking at the die from the top, the appearance is that of a cutting edge the same shape as the block to be cut surrounded by a succession of flat or sloping triangles $c$, and outside of this there is a row of perforating pyramidal apexes $a$, and the other die shown is the same, with the perforating-row of pyramidal apexes $a$ left off.

The dies for making mosaics at present in use, while they stamp the blocks the edges are not perfect on the mosaic and it is necessary to have the one face with perfect and regular edges to make perfect tiling. It can be readily seen that when a mosaic is to be stamped or cut from a larger piece, sometimes many times larger, where the die strikes the stone, the cutting portion of said die being like an edge-tool, the line of fracture is irregular and zigzag, the same as when the stone is cut with a straight knife-edge chopping-machine, the edge is not true, and here and there pieces are nicked from the face at the edge. Again, this is true, only to a greater extent, in stamping, for instance, triangular blocks. It is almost impossible to preserve the apexes. The same is the case with other polygons and with circles, segments, and numerous nicks are broken out in punching with the dies now in use. In my invention I thus obviate these difficulties in severing from a larger plate of stone a block, say, about one-eighth to one-fourth of an inch larger than the piece I desire and exactly the same shape. This leaves an easy shelling off of the said extra size and the block is preserved perfect on the edge which first came in contact with the die, which is its face, so that all the breaking of points and other irregularities caused by the first severance are left perfect on the finished mosaic.

The inner cutting edge $b$ on the female die and the outer cutting edge $l$ on the male die are the same as are used throughout the metal trades for stamping purposes.

Having thus described my invention, what I claim, and desire to secure by Letters Patent, is—

1. A female die for cutting mosaics, having an inner cutting edge in combination with exterior cutting edges or ridges, points and valleys, for the purpose of crushing and carrying away the severed and waste portions from the outer edges of the mosaic piece as and for the purpose set forth and described.

2. The combination between a punch having a cutting edge $l$ and a cutting edge $m$; and a female die having an ordinary cutting inner edge in connection with auxiliary triangular-shaped exterior cutting edges and rows of points as and for the purpose set forth and described.

3. In a female die for cutting mosaics having an ordinary cutting inner edge in combination with an auxiliary triangular-shaped exterior cutting edge and rows of perforating-points forming the same shaped piece as the required piece, as set forth and described.

4. The combination in an ordinary female die having an ordinary cutting edge, and an auxiliary exterior triangular-shaped cutting edge and in connection with additional rows of perforating pyramidal points, parallel to the first-mentioned cutting edge, and severing or cutting lines, $n\ a$, as and for the purpose set forth and described.

5. The combination between a punch having cutting edge $l$ and cutting edge $m$, and a female die, the cutting edges of the triangles, the perforating-points $a$, the severing-lines $a\ n$, severing-line $h$, and valleys $h^2$ for carrying away the broken portions as and for the purposes set forth and described in the annexed drawings and specification.

Signed at Paterson, in the county of Passaic and State of New Jersey, this 10th day of April, A. D. 1901.

WILLIAM A. ARNOLD.

Witnesses:
CHARLES H. SKELTON,
PETER N. VENABLE.